(12) United States Patent
Froböse

(10) Patent No.: US 9,120,135 B2
(45) Date of Patent: Sep. 1, 2015

(54) CHUCK FOR A COLD-PILGERING MILL

(75) Inventor: Thomas Froböse, Versmold (DE)

(73) Assignee: Sandvik Materials Technology Deutschland GMBH, Düsseldorf (DE)

(*) Notice: Subject to any disclaimer, the term of this patent is extended or adjusted under 35 U.S.C. 154(b) by 960 days.

(21) Appl. No.: 13/319,847

(22) PCT Filed: May 5, 2010

(86) PCT No.: PCT/EP2010/056113
§ 371 (c)(1),
(2), (4) Date: Feb. 3, 2012

(87) PCT Pub. No.: WO2010/130614
PCT Pub. Date: Nov. 18, 2010

(65) Prior Publication Data

US 2012/0139195 A1 Jun. 7, 2012

(30) Foreign Application Priority Data

May 15, 2009 (DE) .......................... 10 2009 003 172

(51) Int. Cl.
*B23B 31/16* (2006.01)
*B21B 21/04* (2006.01)
*B23B 13/12* (2006.01)

(52) U.S. Cl.
CPC ............ *B21B 21/045* (2013.01); *B23B 13/125* (2013.01); *Y10T 279/17119* (2015.01); *Y10T 279/1986* (2015.01)

(58) Field of Classification Search
CPC ................ B23B 21/045; B23B 13/125; Y10T 279/1986
USPC ................... 72/250, 252, 257, 290, 208, 214; 279/122, 20.1, 124, 57, 37, 55, 74, 82
See application file for complete search history.

(56) References Cited

U.S. PATENT DOCUMENTS 67,993 A * 8/1867 Loomis .......................... 408/163

(Continued)

FOREIGN PATENT DOCUMENTS

DE 853138 7/1949

(Continued)

OTHER PUBLICATIONS

International Search Report for PCT/EP2010/056113.
German Search Report dated Aug. 11, 2009.

*Primary Examiner* — Eric A Gates
*Assistant Examiner* — Paul M Janeski
(74) *Attorney, Agent, or Firm* — Morgan, Lewis & Bockius LLP

(57) ABSTRACT

The present invention concerns a clamping chuck for a cold pilger rolling mill, comprising clamping a sleeve and at least two clamping jaw carriers. The chucks known from the state of the art have a hollow-cylindrical guide sleeve, into which are inserted from the end clamping jaws which are pressed against the tube shell by means of a clamping sleeve which is also to be introduced from the end of the guide sleeve. In comparison with that state of the art the object of the present invention is to provide a clamping chuck for a cold pilger rolling mill, which permits easy changing of the clamping jaw carriers and thus quick and inexpensive adaptation of the cold pilger rolling mill to tubes of differing diameters and wall thicknesses. To attain that object there is proposed a clamping chuck for a cold pilger rolling mill comprising a substantially hollow-cylindrical clamping sleeve having an inner peripheral surface and a cylinder axis, wherein the inner peripheral surface has at least one clamping portion whose surface includes an angle with the cylinder axis in the axial direction, and with at least a first and a second clamping jaw carrier, wherein at a first end the clamping sleeve has at least one first slot-shaped opening so that a clamping jaw carrier can be introduced into the clamping sleeve in the radial direction through the opening, wherein each clamping jaw carrier has an outside surface extending substantially parallel to the cylinder axis and a clamp surface which is arranged opposite the outside surface and which extends substantially parallel to the cylinder axis, wherein the outside surface and the clamp surface define a wedge, and wherein the clamping sleeve is displaceable parallel to the cylinder axis and relative to the clamping jaw carriers in such a way that the clamping portion of the clamping sleeve engages with the outside surface of the clamping jaw carriers.

24 Claims, 7 Drawing Sheets

(56) References Cited

U.S. PATENT DOCUMENTS

Figure 1:
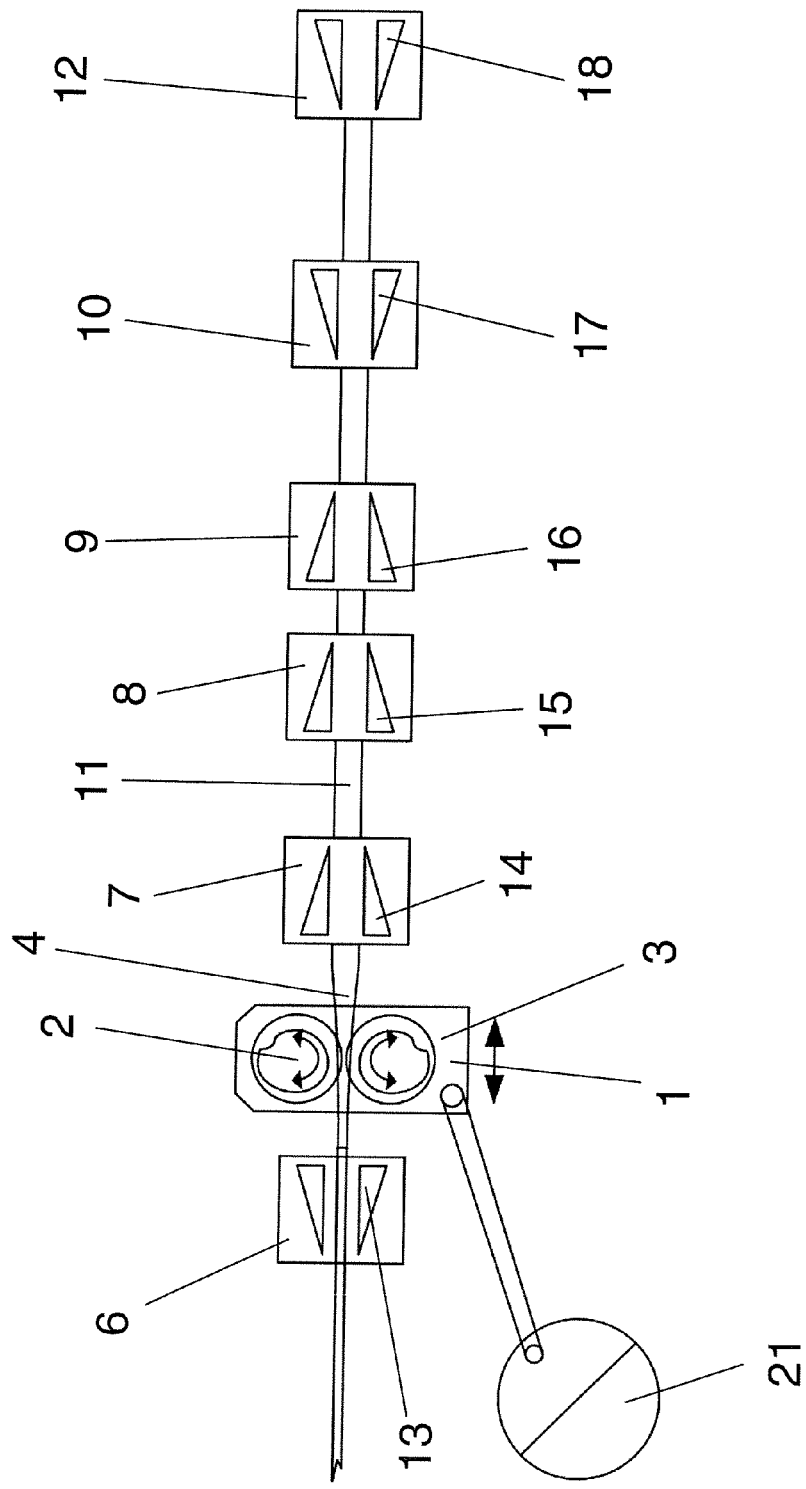

| | | | |
|---|---|---|---|
| 259,434 A * | 6/1882 | Stockwell | 408/172 |
| 637,772 A * | 11/1899 | Eilers | 408/163 |
| 2,430,761 A * | 11/1947 | Duphily | 279/74 |
| 3,584,489 A | 6/1971 | Peytavin | |
| 3,688,540 A | 9/1972 | Russel | |
| 3,698,225 A | 10/1972 | Peytavin | |
| 3,948,070 A | 4/1976 | Hentzschel et al. | |
| 4,019,394 A | 4/1977 | Peytavin | |
| 4,037,444 A | 7/1977 | Ledebur et al. | |
| 4,090,386 A | 5/1978 | Naylor et al. | |
| 4,154,079 A | 5/1979 | Peytavin | |
| 4,407,438 A | 10/1983 | Wiechmann | |
| 4,577,483 A | 3/1986 | Rehag et al. | |
| 4,641,513 A | 2/1987 | Peytavin | |
| 4,743,216 A | 5/1988 | Chen et al. | |
| 4,930,328 A | 6/1990 | Duerring | |
| 5,351,515 A | 10/1994 | Astley et al. | |
| 5,540,076 A | 7/1996 | Baensch et al. | |
| 6,012,313 A | 1/2000 | Persico | |
| 6,688,152 B2 | 2/2004 | Klingen et al. | |
| 7,992,417 B2 | 8/2011 | Hayashi | |
| 8,191,391 B2 | 6/2012 | Baensch | |
| 2004/0045334 A1 | 3/2004 | Baensch | |
| 2004/0173001 A1 | 9/2004 | Stinnertz et al. | |
| 2012/0125066 A1 | 5/2012 | Froböse | |
| 2013/0186214 A1 | 7/2013 | Froböse | |

FOREIGN PATENT DOCUMENTS

| | | |
|---|---|---|
| DE | 16 02 066 | 4/1967 |
| DE | 34 28 437 | 8/1984 |
| DE | 38 23 134 | 7/1988 |
| DE | 689 19 343 | 3/1995 |
| EP | 1034852 | 9/2000 |
| GB | 1136195 | 12/1968 |
| SU | 770 579 | 10/1980 |

* cited by examiner

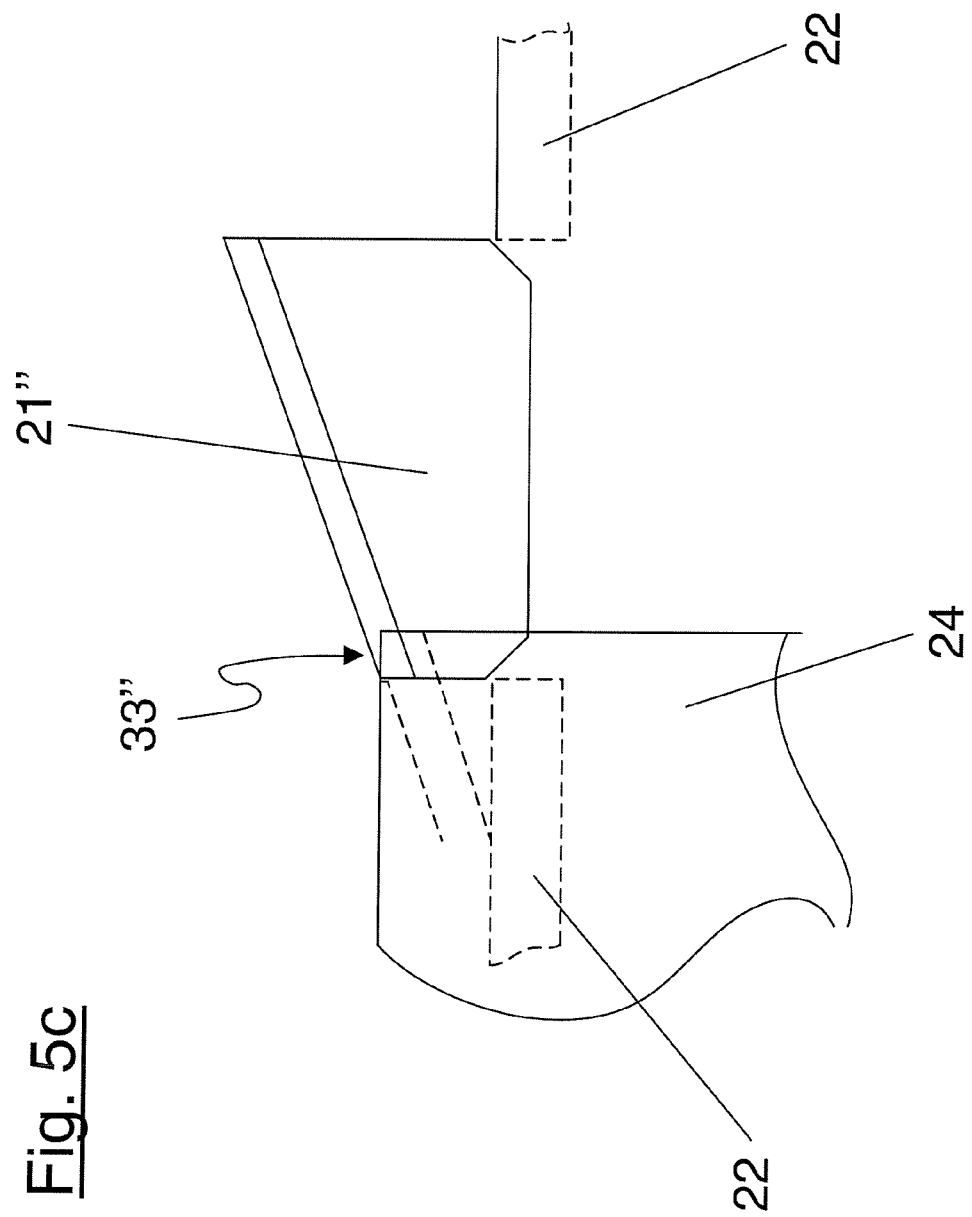

CHUCK FOR A COLD-PILGERING MILL

RELATED APPLICATIONS

The present application is a U.S. National Phase Application of International Application No. PCT/EP2010/056113 (filed 5 May 2010) which claims priority to German Application No. 10 2009 003 172.3 (filed 15 May 2009).

The present invention concerns a clamping chuck for a cold pilger rolling mill comprising a clamping sleeve and at least two clamping jaw carriers. To produce precise metal tubes, in particular of steel, an expanded hollow-cylindrical blank is cold reduced in the completely cold condition by pressure stresses. In that case the blank is converted to the form of a tube of defined reduced outside diameter and defined wall thickness.

The most wide-spread reducing method for tubes is known as cold pilgering, the blank being referred to as the tube shell. In the rolling operation the tube shell is pushed over a rolling mandrel which is calibrated, that is to say which is of the inside diameter of the finished tube, and in that situation is embraced from the outside by two rolls which are calibrated, that is to say which define the outside diameter of the finished tube, and is rolled out in the longitudinal direction over the rolling mandrel.

During cold pilgering the tube shell experiences a stepwise feed in a direction towards the rolling mandrel or beyond same, while the rolls are horizontally reciprocated rotatingly over the mandrel and thus the tube shell. In that case the horizontal movement of the rolls is predetermined by a roll stand to which the rolls are rotatably mounted. In known cold pilger rolling mills the roll stand is reciprocated by means of a crank drive in a direction parallel to the rolling mandrel while the rolls themselves receive their rotary movement from a rack which is stationary relative to the roll stand and into which engage the gears which are fixedly connected to the roll shafts.

The conically calibrated rolls arranged in mutually superposed relationship in the roll stand rotate in opposite relationship to the feed direction of the feed clamping saddle. The so-called pilger mouth formed by the rolls engages the tube shell and the rolls push a small wave of material away from the outside, the wave being stretched out by the smoothing caliber of the rolls and the rolling mandrel to afford the intended wall thickness until the clearance caliber of the rolls releases the finished tube. During the rolling operation the roll stand with the rolls mounted thereto moves in opposite relationship to the feed direction of the tube shell.

The feed of the tube shell over the mandrel is effected by means of a feed clamping saddle which permits a translatory movement in a direction parallel to the axis of the rolling mandrel. After reaching the clearance caliber of the rolls the tube shell is fed by means of the feed clamping saddle by a further step towards the rolling mandrel while the rolls with the roll stand move back into their horizontal starting position. At the same time the tube shell is rotated about its axis driven by the clamping chuck of the feed clamping saddle to achieve a uniform shape for the finished tube. Rolling over each tube portion a plurality of times provides a uniform wall thickness and roundness for the tube and uniform inside and outside diameters.

To hold the tube shell and to be able to displace it in a translatory movement towards the rolling mandrel and a rotary movement about the rolling mandrel the feed clamping saddle has a clamping chuck with which the tube shell is held between three clamping jaws.

The clamping chucks known from the state of the art have a hollow-cylindrical guide sleeve into which are inserted from the end clamping jaws which are pressed against the tube shell by means of a clamping sleeve which is also to be introduced from the end of the guide sleeve. In those clamping chucks known from the state of the art, a clamping jaw change operation is personnel-intensive and time-intensive because of the clamping jaws which are to be introduced into the guide sleeve at the end, as the individual clamping jaws each have to be held in themselves in the installation operation.

The cold pilger rolling mills known from the state of the art each only permit rolling out tubes of a single tube diameter and a single tube wall thickness which is predetermined by the respective rolling mandrel. Converting production to a different type of tube involving a different diameter and/or a different wall thickness requires expensive conversion of the entire rolling mill. For that purpose the clamping jaw carriers of the clamping chuck of the feed clamping saddle, the clamping jaw carriers of the other chucks provided for transport of the tube shell upstream of the rolling mandrel and for transport of the finished tube downstream of the rolling mandrel as well as the mandrel have to be removed in a complicated and laborious procedure, replaced by clamping jaw carriers and rolling mandrels respectively of the appropriate new diameters, and they in turn have to be fitted in place in a complicated and expensive procedure.

Because the clamping jaw carriers have to be introduced into the guide sleeves from the end the clamping chucks known from the state of the art in cold pilger rolling mills can be held rotatably in a bearing only at their one end that is opposite to the clamping jaw carriers.

In comparison with that state of the art the object of the present invention is to provide a clamping chuck for a cold pilger rolling mill, which permits easy change of the clamping jaw carriers and thus fast and inexpensive adaptation of the cold pilger rolling mill to tubes of differing diameters and wall thicknesses. A further object of the invention is to provide a clamping chuck which can be used both as a chuck for the tube shell and the finished tube respectively at all locations in the installation, that is to say upstream and downstream of the rolling mandrel, and also for holding the rolling mandrel itself.

According to the invention at least one of the aforementioned objects is attained by a clamping chuck for a cold pilger rolling mill, comprising a substantially hollow-cylindrical clamping sleeve with an inner peripheral surface and a cylinder axis, wherein the inner peripheral surface has at least one clamping portion, the surface of which includes an angle with the cylinder axis in the axial direction, and at least a first and a second clamping jaw carrier, wherein the clamping sleeve has at least one first slot-shaped opening at a first end so that a clamping jaw carrier can be introduced in the radial direction through the opening into the clamping sleeve, wherein each clamping jaw carrier has an outside surface extending substantially parallel to the cylinder axis and a clamp surface arranged in opposite relationship to the outside surface and extending substantially parallel to the cylinder axis, wherein the outside surface and the clamp surface define a wedge, and wherein the clamping sleeve is displaceable parallel to the cylinder axis and relative to the clamping jaw carriers in such a way that the clamping portion of the clamping sleeve engages with the outside surface of the clamping jaw carriers.

The clamping chuck according to the invention makes it possible for the clamping jaw carriers with the actual clamping jaws which can be fastened thereto to be introduced into the chuck in the radial direction and to be fixed individually, successively to or in the chuck. In contrast to axially introducing the clamping jaw carriers in the state of the art the arrangement according to the invention, by virtue of radial introduction of the clamping jaw carriers, makes it possible to easily replace the clamping jaw carriers and thus to adapt all clamping chucks of the cold pilger rolling mill quickly to new tube diameters or wall thicknesses respectively.

In addition the clamping chuck according to the invention can be held with bearings at its two opposite ends as axial accessibility is no longer required from at least one of the ends and in addition the chuck according to the invention not only makes it possible to clamp the tube shell or the finished tube in place, but, when used at a suitable location in the cold pilger rolling mill, also makes it possible to clamp the rolling mandrel which, accommodated in the chuck according to the invention, can be easily and quickly exchanged for mandrels of different diameters.

For better understanding the basic concept of the clamping chuck according to the invention the process of introducing the clamping jaw carrier into a clamping chuck in an embodiment with only two clamping jaw carriers will now be described.

In a first step the hollow-cylindrical clamping sleeve is displaced in the axial direction so that it permits the first clamping jaw carrier to be introduced into the clamping chuck in the radial direction. In that case the clamping jaw carrier is preferably introduced into the chuck perpendicularly from above. The clamping sleeve is then displaced by a further step so that the edge of the sleeve covers over the first clamping jaw carrier in at least portion-wise fashion. That prevents the clamping jaw carrier from dropping out of the clamping chuck. The clamping chuck or the clamping sleeve with the first clamping jaw carrier can now be rotated out of the vertical position of the first clamping jaw carrier. In that case rotation of the clamping chuck in the example of a clamping chuck with only two clamping jaw carriers is preferably 180° so that the second clamping jaw carrier can also be introduced into the clamping chuck perpendicularly from above. In order to permit the second clamping jaw carrier to be introduced into the clamping chuck in spite of the displacement of the clamping sleeve in the axial direction so that the first clamping jaw carrier cannot drop out of the chuck, the clamping sleeve according to the invention has an opening.

In that respect the opening in an embodiment of the invention is a slot which extends from a first end of the clamping sleeve or the base surface thereof and which in the peripheral direction is of a width approximately corresponding to the width of the clamping jaw carrier while the length of the opening in the axial direction is precisely such that it permits introduction of the second clamping jaw carrier although the clamping sleeve was displaced by a step in order with its edge to hold the first clamping jaw in the chuck.

As the clamping sleeve has at least one clamping portion at its inner peripheral surface, the surface of which clamping portion includes an angle with the cylinder axis in the axial direction and each clamping jaw carrier is of a wedge-shaped configuration, in the further forward pushing movement and upon engagement of the clamping portion with the outside surfaces of the clamping jaw carriers, there is applied to the clamping jaw carriers and thus to the clamping jaws connected thereto, in the radial direction, a force which holds the object received in the chuck, that is to say in particular the tube shell or also the clamping mandrel.

In an embodiment the clamping sleeve has at least a first and a second slot-shaped opening, wherein the first and second openings have ends spaced from each other in a direction parallel to the cylinder axis. In such an embodiment two or also three clamping jaw carriers can be accommodated in accordance with the above-described process in the clamping jaw carrier, with the clamping sleeve.

In a preferred embodiment the clamping sleeve has three slot-shaped openings which are spaced from each other in the peripheral direction each through 120° and which have ends spaced from each other in a direction parallel to the cylinder axis. With such an arrangement three clamping jaw carriers distributed uniformly over the periphery of the clamping chuck can be received in a clamping chuck. In that respect the decisive consideration is that the ends of the openings are arranged at different axial positions to permit successive introduction of the individual clamping jaw carriers.

In a further embodiment of the invention the clamping sleeve is rotatable about the cylinder axis, preferably driven by motor means. In that way a clamping jaw carrier which has already been introduced can be rotated about a given angular position by rotation of the clamping sleeve in order to permit the further clamping jaw carriers to be inserted. In that respect, in an embodiment of the invention, the clamping sleeve, that is to say in particular the side walls of the corresponding opening, entrains the clamping jaw carrier in the rotary movement and positions it in a new angular position.

In a preferred embodiment the opening of the clamping sleeve considered in a cross-section perpendicular to the cylinder axis has a portion which is narrowed in the peripheral direction. When a clamping jaw carrier of a correspondingly complementary configuration is introduced in the radial direction into such an opening, the clamping jaw carrier is held in a given radial position by the narrowing configuration of the opening.

In a further preferred embodiment the clamping chuck has a substantially hollow-cylindrical guide sleeve having a first and a second end and in which the object to be held with the clamping chuck can be received, wherein the guide sleeve has at least one opening for receiving a clamping jaw carrier.

In an embodiment the guide sleeve is concentrically surrounded by the clamping sleeve, wherein the clamping sleeve is movable or displaceable axially relative to the guide sleeve.

In a preferred embodiment of the invention the guide sleeve is rotatable about the cylinder axis, preferably together with the clamping sleeve, wherein the guide sleeve has a respective bearing at its first and its second end, and the clamping jaws and the clamping sleeve are arranged between the bearings. It is only the clamping chuck according to the invention, in particular the combination comprising clamping jaw carriers and clamping sleeve, that makes it possible for the clamping chuck or its guide sleeve to be supported at two opposite ends thereof. In comparison with those clamping chucks which only have a bearing arrangement at one end, that signifies markedly increased stability for the arrangement and as a result reduced oscillations and vibrations of the tube shell and the reduced tube.

The present invention also concerns a cold pilger rolling mill having a clamping chuck in one of the above-described configurations. In that case the clamping chuck according to the invention can be used in the cold pilger rolling mill both for receiving and holding the tube shell or the finished reduced tube respectively, and also for holding the rolling mandrel or a tool holder, that is to say a mandrel bar, which carries the rolling mandrel.

In an embodiment the cold pilger rolling mill according to the invention has a plurality of feed and holding devices each having at least one respective clamping chuck, as was described hereinbefore. The feed and holding devices are in particular a mandrel support, a feed clamping device for the tube shell, an entry clamping device for the tube shell, an exit clamping device for the reduced tube and a clamping device for a rolling mandrel or a tool holder connected thereto.

In a preferred embodiment of the cold pilger rolling mill according to the invention all clamping chucks of the mill are identical except for the dimensioning of the clamping jaw carriers. The dimensioning of the clamping jaw carriers is adapted to the respective requirements involved. Thus, a different nominal diameter to be clamped is generally required for holding the mandrel bar, from that required for clamping the tube shell or for clamping the finished tube.

The present invention further concerns a method of mounting clamping jaw carriers of a clamping chuck for a cold pilger rolling mill comprising the steps of displacing a hollow-cylindrical clamping sleeve so that the chuck is opened for introduction of the clamping jaw carriers, inserting a first clamping jaw carrier into the chuck, displacing the clamping sleeve so that the clamping sleeve holds the first clamping jaw carrier in the chuck, rotating the clamping sleeve together with the first clamping jaw carrier into a second position, inserting a second clamping jaw carrier into the chuck, and displacing the clamping sleeve over the clamping jaw carriers so that the clamping sleeve exerts a force on the clamping jaw carriers in the radial direction.

Further advantages, features and possible uses of the present invention will be apparent from the description hereinafter of an embodiment and the accompanying Figures.

Figure 2:
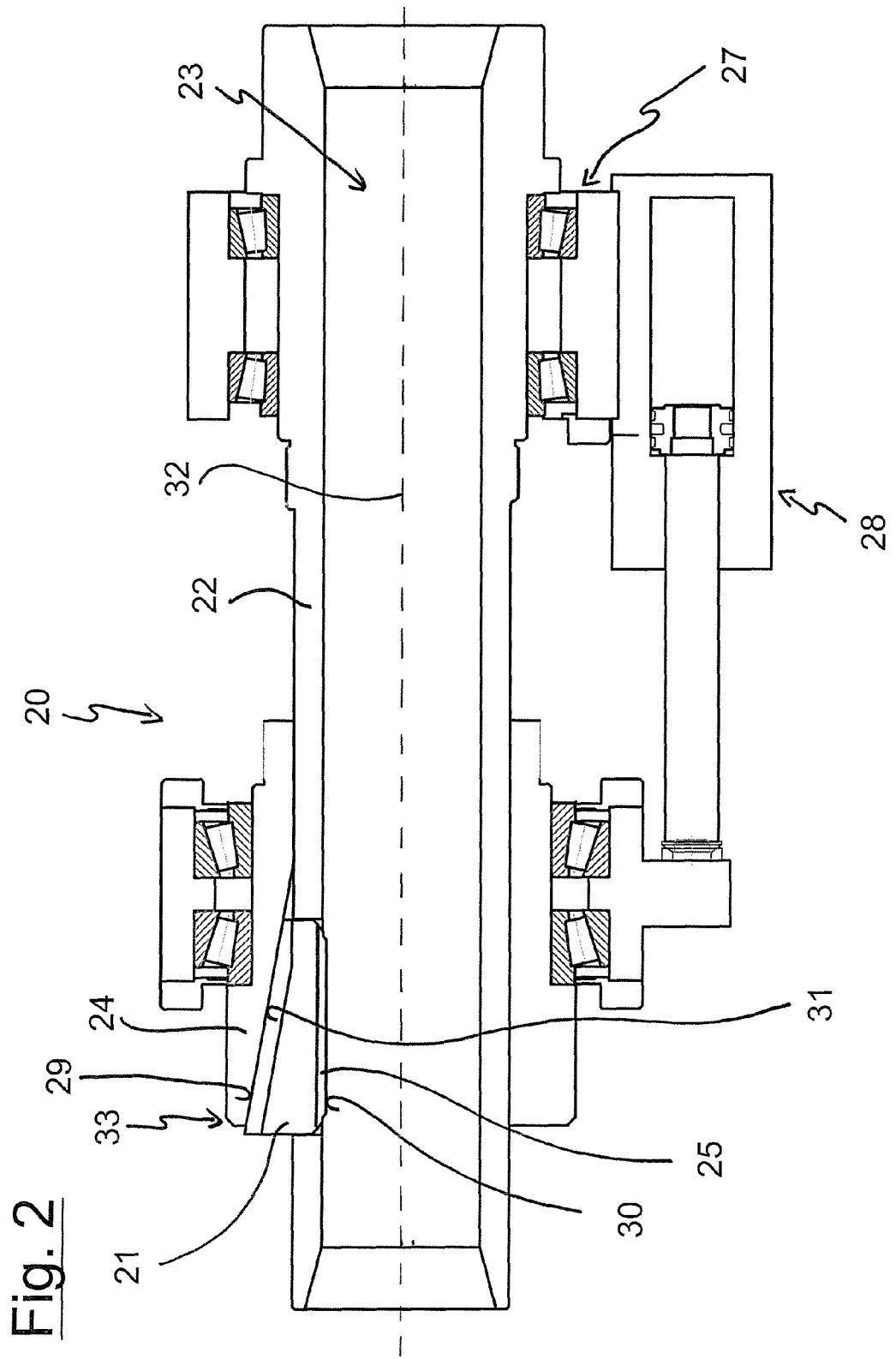
Figure 3:
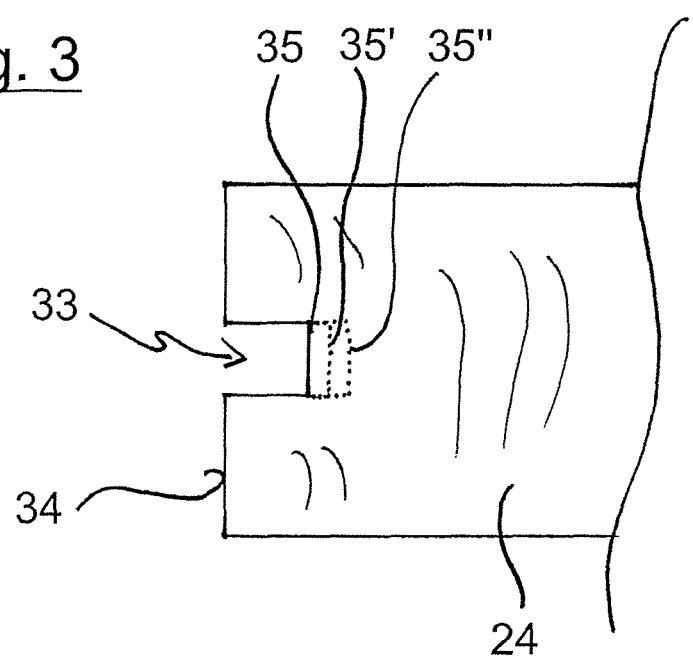
Figure 4:
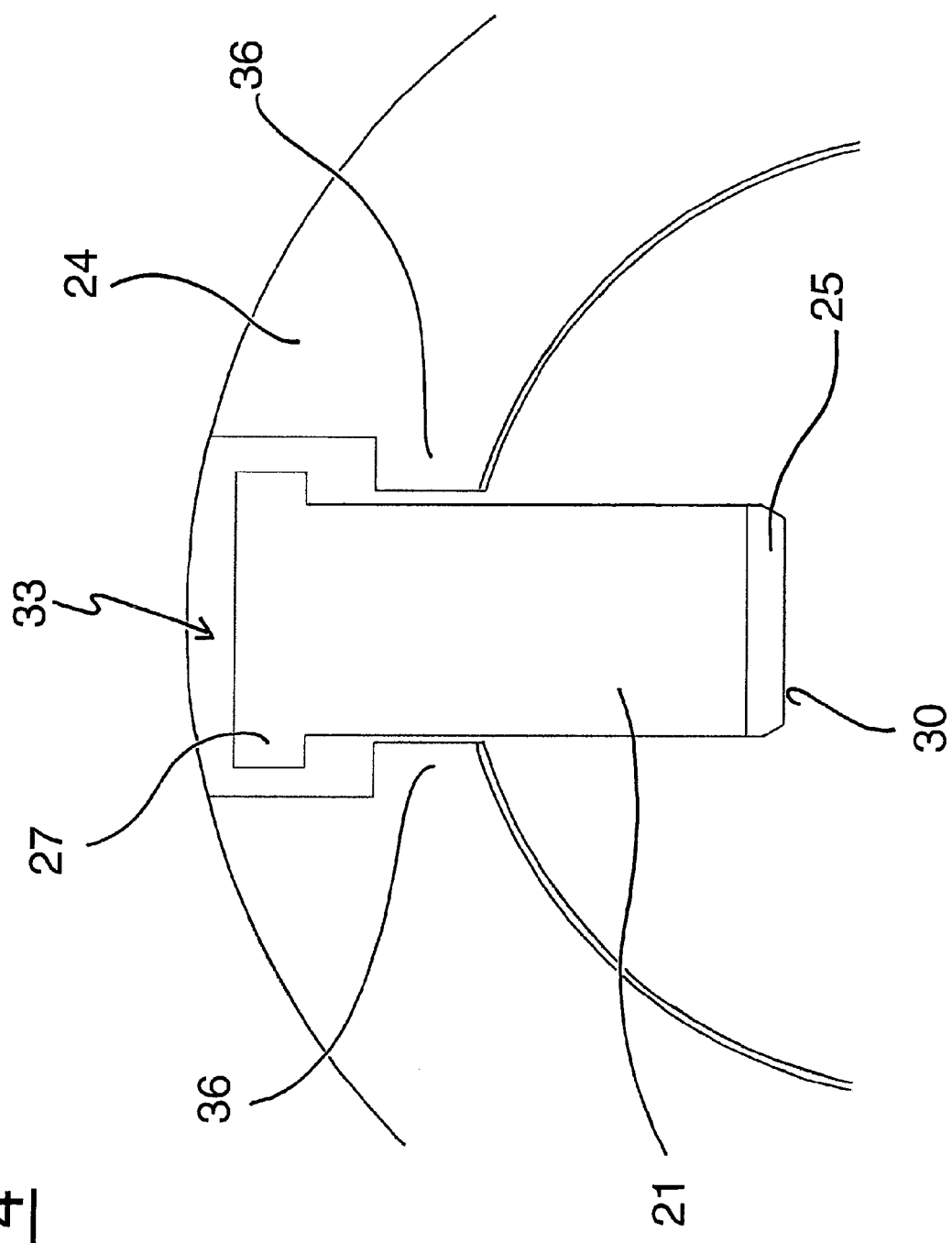
Figure 5A:
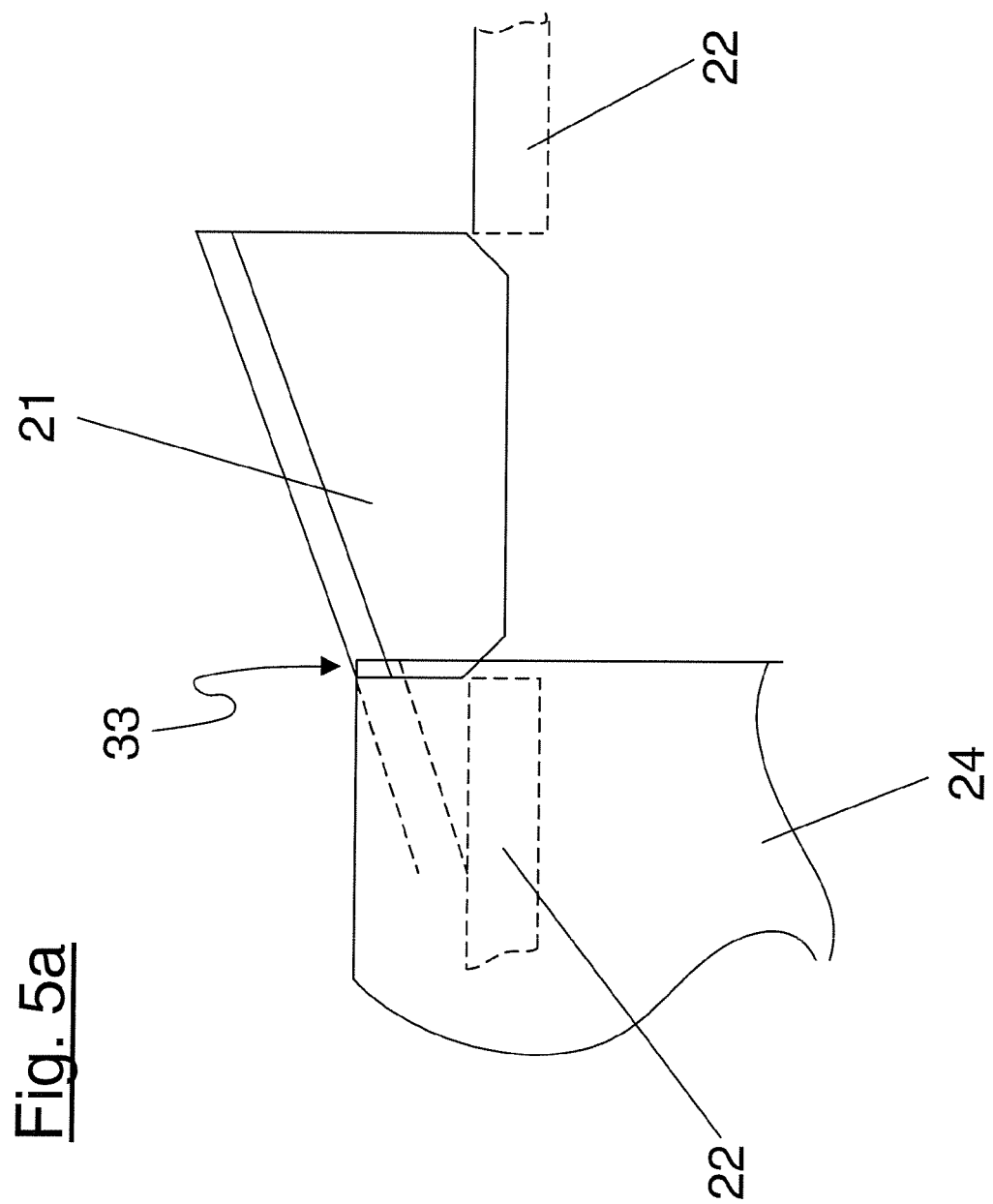
Figure 5B:
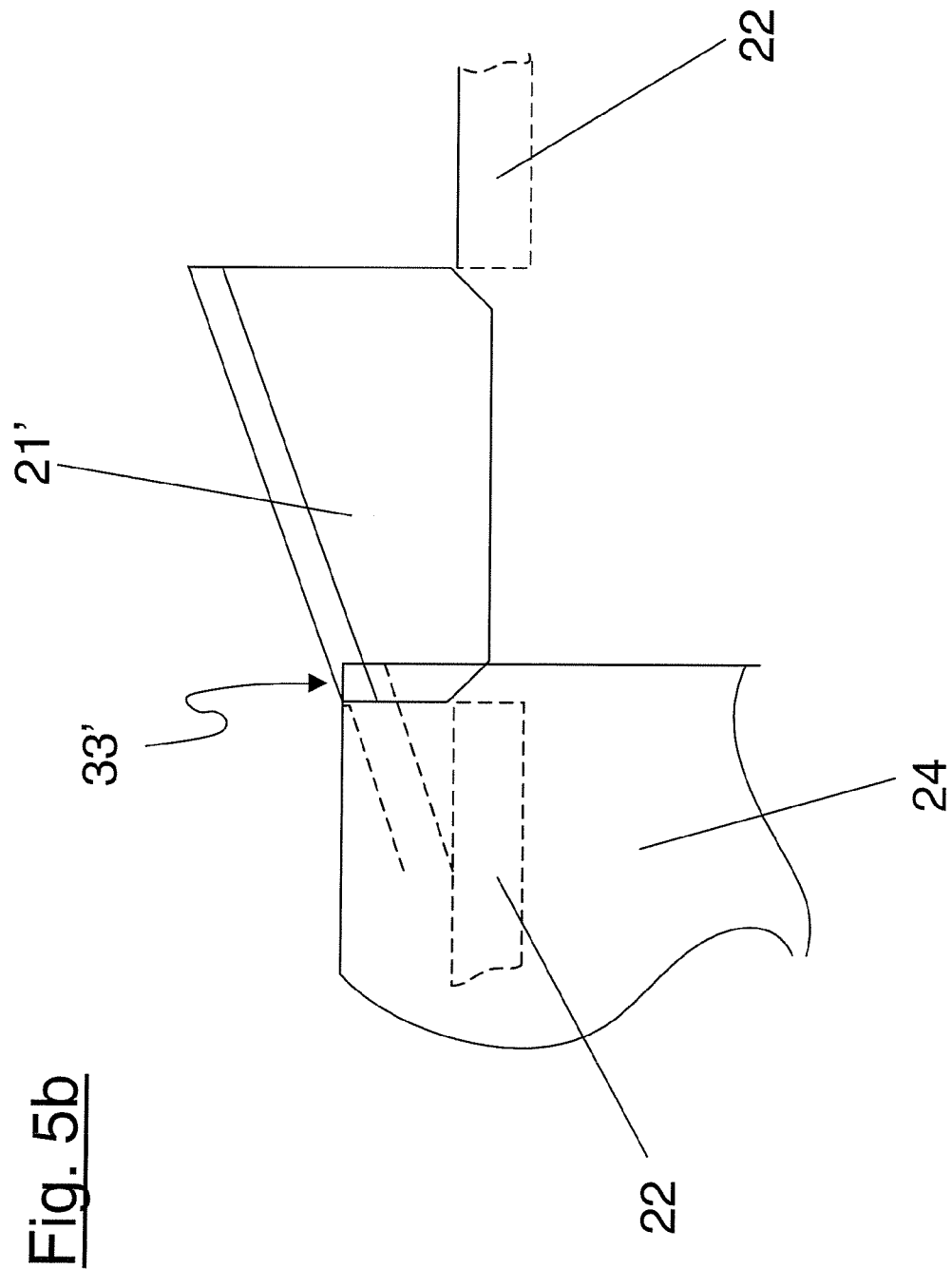

FIG. 1 shows a diagrammatic side view of the structure of a cold pilger rolling mill with clamping chucks according to an embodiment of the present invention, FIG. 2 shows a diagrammatic side view of a clamping chuck according to the invention of the cold pilger rolling mill of FIG. 1, FIG. 3 shows a broken-away view from above of the clamping sleeve of an embodiment of the clamping chuck according to the invention, FIG. 4 shows a broken-away cross-sectional view of the clamping sleeve in an embodiment of the invention in a plane perpendicular to the cylinder axis, and FIGS. 5a through c show stepwise the process of inserting clamping jaw carriers into a clamping chuck in accordance with an embodiment of the present invention.

FIG. 1 is a diagrammatic side view showing the structure of a cold pilger rolling mill with clamping chucks according to the invention. The rolling mill substantially comprises a roll stand 1 with two rolls 2, 3, a calibrated rolling mandrel 4 and a plurality of clamping devices 6, 7, 8, 9, 10, 12 each having a respective clamping chuck 13 through 18 according to the invention.

In the illustrated embodiment the cold pilger rolling mill has six identical clamping chucks 13 through 18 according to the invention. The clamping chucks 13 through 18 only differ in the dimensioning of their clamping jaw carriers which are of such a size that they can clamp different nominal diameters.

Thus two mandrel supports 10, 12 at the entry end of the cold pilger rolling mill (at the right in FIG. 1) each with a respective clamping chuck 17, 18 serve to hold the mandrel bar, to the front end of which is fixed the actual tool, namely the rolling mandrel 4. The two clamping chucks 17, 18 alternately hold the mandrel bar. When a tube shell 11 is introduced into the rolling mill the clamping jaw 18 of the first mandrel support 12 is opened while the clamping jaw 17 of the second mandrel support 10 grips the mandrel bar. When the tube shell 11 has passed the first mandrel support 12 the clamping chuck 18 of the first mandrel support 12 grips the mandrel bar and the clamping chuck 17 of the second mandrel support 10 is opened to allow the tube shell 11 to pass through.

Two further clamping chucks 15, 16 each mounted on a respective feed clamping saddle 8, 9 alternately clamp the tube shell 11 and ensure the feed movement of the tube shell 11 over the mandrel 4. The entry clamping device 7, by means of the chuck 14, clamps the tube shell 11 upstream of the roll stand as the entry clamping chuck. The feed device 6 with clamping chuck 13, as the exit clamping chuck, receives the finished reduced tube and pushes it out of the mill.

During the cold pilgering operation on the rolling mill shown in FIG. 1 the tube shell, driven by the feed clamping saddle 7, 8, experiences a stepwise feed towards or beyond the rolling mandrel 4 while the rolls 2, 3 are horizontally reciprocated rotatingly over the mandrel 4 and thus over the tube shell 11. In that case the horizontal movement of the rolls 2, 3 is predetermined by the roll stand 1 on which the rolls 2, 3 are rotatably mounted. The roll stand 1 is reciprocated by means of a crank drive in a direction parallel to the rolling mandrel while the rolls 2, 3 themselves receive their rotary movement from a rack which is stationary relative to the roll stand 1 and in which gears fixedly connected to the roll shafts engage.

The feed of the tube shell 11 over the mandrel 4 is effected by means of the feed clamping saddles 8, 9 which alternately grip the tube shell 11 by means of the chucks 15, 16 and permit a translatory movement in a direction parallel to the axis of the rolling mandrel 4. The conically calibrated rolls 2, 3 arranged in mutually superposed relationship in the roll stand rotate in opposite relationship to the feed direction of the feed clamping saddles 8, 9. The so-called pilger mouth formed by the rolls engages the tube shell 11 and the rolls 2, 3 press a small wave of material away from the outside, the wave being stretched out by a smoothing caliber of the rolls 2, 3 and the rolling mandrel 4 to give an intended wall thickness until a clearance caliber of the rolls 2, 3 releases the finished tube. During the rolling procedure the roll stand 1 with the rolls 2, 3 mounted thereto moves in opposite relationship to the feed direction of the tube shell 11. After reaching the clearance caliber of the rolls 2, 3 the tube shell 11 is advanced by means of the feed clamping saddles 8, 9 by a further step towards the rolling mandrel 4 while the rolls 2, 3 return with the roll stand to their horizontal starting position. At the same time the tube shell 11 experiences a rotation about its axis to achieve a uniform shape for the finished tube. A uniform wall thickness and roundness for the tube and uniform inside and outside diameters are achieved by rolling over each tube portion a plurality of times.

A central procedural control system controls the initially independent drives of the roll mill so that the above-described procedure in the rolling process is achieved.

FIG. 2 shows a diagrammatic sectional side view of a clamping chuck according to the invention, as is used in the cold pilger rolling mill of FIG. 1 for holding the tube shell on the feed clamping saddle 5 and for fixing the rolling mandrel 4 in identical form.

In this case the clamping chuck 20 in FIG. 2 is in a condition of being completely opened for the insertion of a first clamping jaw carrier 21.

The base structure of the clamping chuck 20 is formed by a hollow-cylindrical guide sleeve 22, in the cylindrical hollow cavity 23 of which the object to be held, that is to say in the case of the cold pilger rolling mill shown in FIG. 1 the tube shell or the rolling mandrel 4, can be received. In the illustrated embodiment the clamping chuck 20 has three clamping jaw carriers 21 which are arranged in mutually spaced relationship each through 120° in the peripheral direction around the cylinder axis of the guide sleeve 22 or the clamping sleeve 24. In that way the clamping jaws 25 of the clamping jaw carriers 21 grip the object to be held in the manner of a three-point mounting, from three different directions. To permit rotary movements of the tube shell and the rolling mandrel the guide sleeve 22 and the clamping sleeve 24 are supported rotatably. For that purpose the guide sleeve 22 has bearings 27. In that respect the configuration of the clamping chuck 20 with radial introduction of the clamping jaw carriers 21, permits the clamping jaw carriers 21 and the clamping sleeve 24 to be arranged between the bearings 27 or provide that the chuck can first be held at all with two mutually spaced bearings. The clamping sleeve 24 is displaceable relative to the guide sleeve 22 and the clamping jaw carriers 21 by means of a hydraulic drive 28.

Each clamping jaw carrier 21 has an outside surface 29 arranged in opposite relationship to the clamping jaw 25, wherein the clamp surface 30 of the clamping jaw 25 extends substantially parallel to the cylinder axis of the guide sleeve 22 or the clamping sleeve 24 while the outside surface 29 and the clamp surface 30 include an angle relative to each other so that, as shown in FIG. 2, the clamping jaw carrier defines a wedge shape between the clamp surface 30 of the clamping jaw 25 and the outside surface 29. In complementary relationship with the configuration of the outside surface 29 of the clamping jaw carrier 21 the clamping sleeve 24 has an inner peripheral surface which portion-wise forms clamping surfaces 31, wherein the clamping surfaces 31 include with the cylinder axis 32 the same angle as the angle between the clamp surface 30 and the outside surface 29 of the clamping jaw carrier 21.

As indicated in FIG. 2, upon displacement of the clamping sleeve 24 in the direction of the clamping jaw carriers 21 the clamping surface 31 of the clamping sleeve 24 is displaced slidingly on the outside surface 29 of the clamping jaw carrier 21 whereby the clamping jaw carrier 21 is displaced in the radial direction towards the cylinder axis 32 and a force is exerted in the radial direction on the clamping jaw carrier 21 and thus on the clamping jaw 25 or the clamp surface 30.

As can be seen from FIG. 2 the clamping sleeve 24 is of a substantially hollow-cylindrical shape, wherein the hollow cylinder, in the region of its end facing towards the clamping jaw carriers 21, has three slot-shaped openings 33 spaced from each other through 120° in the peripheral direction of the clamping sleeve 24. Starting from the end of the hollow cylinder of the clamping sleeve 24, that is towards the clamping jaw carriers, those openings 33 extend by differing distances into the hollow cylinder of the clamping sleeve 24.

This is diagrammatically shown in FIG. 3 illustrating a view from above on to the clamping sleeve 24 of FIG. 2. The opening 33 which extends from the front end 34 of the clamping sleeve 24 and which ends with a bottom 35 can be clearly seen. In this case the opening 33 for the first clamping jaw is of the smallest depth. The lengths of the openings 33 for the second and third clamping jaw carriers in the axial direction are larger by 5 mm than the opening 33 for the first clamping jaw carrier. FIG. 3 diagrammatically shows the bottoms 35' and 35" of the second and third openings, as dotted lines for the sake of improved understanding.

To prevent a clamping jaw carrier 21 from directly 'dropping through' in the direction towards the cylinder axis 32 upon insertion into the clamping chuck 20 each of the slot-shaped openings in a cross-section perpendicular to the cylinder axis 32 has a narrowing 36 co-operating with a corresponding widening 37 of the clamping jaw carrier 21. This is diagrammatically shown in FIG. 4 as a sectional view in a plane perpendicular to the cylinder axis 32. The opening 33 in the clamping sleeve 24 has a narrowing 36 while a thickened portion 37 is provided on the clamping jaw carrier 21 at the upper end arranged opposite to the clamping jaw 25, in which case the clamping jaw carrier 21 is prevented from dropping through upon being inserted into the clamping chuck, by the thickened portion 37 of the clamping jaw carrier 21 engaging with the narrowing 36. In that case, in the illustrated embodiment, the thickening 37 at the upper end of the clamping jaw carrier 21 extends over the entire length thereof, just as the narrowing 36 extends over the entire length of the clamping surface 31 and the entire length of the opening 33. Apart from their length (see FIG. 3) the three openings provided on the clamping sleeve 24 are identical.

Reference is made hereinafter to FIGS. 5a-5c to describe how three clamping jaw carriers 21, 21' and 21" are successively introduced into the chuck 20.

In FIG. 5a the clamping sleeve 24 is in the first position shown in FIG. 2 for inserting a first clamping jaw carrier 21 into the chuck. For that purpose the clamping sleeve 24 is in a position of being almost completely opened up in a direction parallel to the cylinder axis 32 while the opening 33 points vertically upwardly. The clamping jaw carrier 21 is inserted from above into the opening 33 in the clamping sleeve 24. After insertion of the first clamping jaw carrier 21 the clamping sleeve 24 is moved by about 5 mm in a direction towards the clamping jaw carrier 21. The clamping sleeve 24 is then in a position shown in FIG. 5b in relation to the displacement parallel to the cylinder axis 32. In that lateral position of the clamping sleeve 24 the clamping sleeve 24 covers the first 5 mm of the first clamping jaw carrier 21 so that it can no longer be removed upwardly from the clamping chuck and also can no longer drop out of same. The clamping sleeve 24 is then rotated through 120° so that, as shown in FIG. 5b, the second opening 33' of the clamping sleeve 24 points vertically upwardly. That second opening 33' which is of a length corresponding to the first displacement step of the clamping sleeve 24 and increased by 5 mm with respect to the first opening 33 points vertically upwardly. The second clamping jaw carrier 21' can be inserted vertically from above into that second opening 33'. The clamping sleeve 24 is then displaced again by 5 mm in a direction parallel to the cylinder axis towards the clamping jaw carrier 21. In that position the clamping sleeve 24 then covers just the first 5 mm also of the second clamping jaw carrier 21' so that it can no longer be removed from or drop out of the chuck.

After a further rotation of the clamping sleeve 24 through 120° a third opening 33' which in turn is of an extent greater by 5 mm, relative to the second opening 33', in a direction parallel to the cylinder axis, points vertically upwardly. The third clamping sleeve 21" can now be inserted into that opening. After a further step in the process all three clamping jaw carriers are received in the chuck and the article to be held, that is to say in particular the tube shell or the clamping mandrel, can be inserted between the clamping jaws into the guide sleeve 22. After that, the clamping sleeve 24 is further displaced in the same direction as before so that the clamping jaw carriers 21, 21', 21" and with them the clamping jaws are moved in a direction towards the cylinder axis 32 and upon engagement with the object to be clamped exert thereon a clamping force in the radial direction.

The reverse sequence of movements permits simple and quick removal of the individual clamping jaw carriers by just one user and subsequent replacement of the clamping jaw carriers by clamping jaw carriers which are provided for clamping an object of a different diameter. Irrespective of the diameter of the object to be clamped the same chuck can always be used, in which case just the clamping jaw carriers are changed. By virtue of its capability of clamping objects of differing diameters the clamping chuck is suitable for receiving both the tube shell and also the clamping mandrel. The modular configuration permits economic operation of the cold pilger rolling mill as only one type of clamping chuck has to be maintained and spare parts and clamping jaw carriers have to be held in readiness only for that one type.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims.

The invention is not limited to the disclosed embodiments. Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

List of References
1 roll stand
2 roll
3 roll
4 rolling mandrel
6 exit clamping device for the finished reduced tube
7 entry clamping device for the tube shell
8, 9 feed clamping saddle for the tube shell
11 tube shell
10, 12 mandrel support
13-18 clamping chuck
20 clamping chuck
21 clamping jaw carrier
22 guide sleeve
23 cavity
24 clamping sleeve
25 clamping jaw
27 bearing
28 drive
29 outside surfaces
30 clamp surface
31 clamping surfaces
32 cylinder axis
33, 33', 33" openings
34 front end of the clamping sleeve
35 bottom
36 narrowing
37 thickened portion

The invention claimed is:

1. A clamping chuck for a cold pilger rolling mill, comprising:
a substantially hollow-cylindrical clamping sleeve with an inner peripheral surface and a cylinder axis, wherein the inner peripheral surface has at least one clamping portion, the surface of which includes an angle with the cylinder axis in the axial direction, and
at least a first and a second clamping jaw carrier,
wherein the clamping sleeve has at least a first and a second slot-shaped opening at a first end and the first and second openings have ends spaced from each other in a direction parallel to the cylinder axis so that a clamping jaw carrier can be introduced in the radial direction through the first and second openings into the clamping sleeve,
wherein each clamping jaw carrier has an outside surface extending substantially parallel to the cylinder axis and a clamp surface arranged in opposite relationship to the outside surface and extending substantially parallel to the cylinder axis, wherein the outside surface and the clamp surface define a wedge, and
wherein the clamping sleeve is displaceable parallel to the cylinder axis and relative to the clamping jaw carriers in such a way that the clamping portion of the clamping sleeve engages with the outside surface of the clamping jaw carriers.

2. A clamping chuck as set forth in claim 1, wherein the clamping sleeve has three slot-shaped openings which are spaced from each other in the peripheral direction each through 120° and which have ends spaced from each other in a direction parallel to the cylinder axis.

3. A clamping chuck as set forth in claim 1, wherein the clamping sleeve is rotatable about the cylinder axis.

4. A clamping chuck as set forth in claim 1, wherein the opening of the clamping sleeve considered in a plane perpendicular to the cylinder axis has a portion which is narrowed in the peripheral direction.

5. A clamping chuck as set forth in claim 1, wherein the clamping jaw carrier has a portion widened in the peripheral direction.

6. A clamping chuck as set forth in claim 1, wherein it has a substantially hollow-cylindrical guide sleeve having a first and a second end and in which the object to be held with the clamping chuck can be received, wherein the guide sleeve has at least one opening for receiving a clamping jaw carrier.

7. A clamping chuck as set forth in claim 1, wherein the guide sleeve is rotatable about the cylinder axis, wherein the guide sleeve has a respective bearing at its first and its second end, wherein the clamping carriers and the clamping sleeve are arranged between the bearings.

8. A cold pilger rolling mill comprising a clamping chuck as set forth in claim 1.

9. A cold pilger rolling mill as set forth in claim 8, wherein the clamping chuck is so adapted that it receives and holds the tube shell.

10. A cold pilger rolling, mill as set forth in claim 8, wherein the clamping chuck is so adapted that it receives and holds a rolling mandrel or a tool holder connected thereto.

11. A cold pilger rolling mill as set forth in claim 8, comprising a mandrel support, a feed clamping device for the tube shell, an entry clamping device for the tube shell, an exit clamping device for the reduced tube and a clamping device for a rolling mandrel or a tool holder connected thereto,
wherein the mandrel support, the feed clamping device for the tube shell, the entry clamping device for the tube shell, the exit clamping device for the reduced tube and the clamping device for the rolling mandrel or the tool holder connected thereto each have at least one clamping chunk.

12. A cold pilger rolling mill as set forth in claim 11, wherein the clamping chuck of the mandrel support, the feed clamping device for the tube shell, the entry clamping device for the tube shell, the exit clamping device for the reduced tube and the clamping device for the rolling mandrel or the tool holder connected thereto are identical except for the dimensioning of the clamping jaw carriers.

13. A method of mounting clamping jaw carriers in a clamping chuck for a cold pilger rolling mill, comprising the steps:
   displacing a hollow-cylindrical clamping sleeve so that the chuck is opened for introduction of the clamping jaw carriers,
   inserting a first clamping jaw carrier into the chuck,
   displacing the clamping sleeve so that the clamping sleeve holds the first clamping jaw carrier in the chuck,
   rotating the clamping sleeve together with the first clamping jaw carrier into a second position,
   inserting a second clamping jaw carrier into the chuck, and
   displacing the clamping sleeve over the clamping jaw carriers so that the clamping sleeve exerts a force on the clamping jaw carriers in the radial direction.

14. A clamping chuck for a cold pilger rolling mill, comprising:
   a substantially hollow-cylindrical clamping sleeve with an inner peripheral surface and a cylinder axis, wherein the inner peripheral surface has at least one clamping portion, the surface of which includes an angle with the cylinder axis in the axial direction, and
   three clamping jaw carriers,
   wherein the clamping sleeve includes three slot-shaped openings at a first end and the three slot-shaped openings are spaced from each other in the peripheral direction each through 120' and which have end spaced from each ether in a direction parallel to the cylinder axis so that a clamping jaw carrier can be introduced in the radial direction through the openings into the clamping sleeve,
   wherein each clamping jaw carrier has an outside surface extending substantially parallel to the cylinder axis and a clamp surface arranged in opposite relationship to the outside surface and extending substantially parallel to the cylinder axis, wherein the outside surface and the clamp surface define a wedge, and
   wherein the clamping sleeve is displaceable parallel to the cylinder axis and relative to the clamping jaw carriers in such a way that the clamping portion of the clamping sleeve engages with the outside surface of the clamping jaw carriers.

15. A clamping chuck as set forth in claim 14, wherein the clamping sleeve is rotatable about the cylinder axis.

16. A clamping chuck as set forth in claim 14, wherein each opening of the clamping sleeve considered in a plane perpendicular to the cylinder axis has a portion which is narrowed in the peripheral direction.

17. A clamping chuck as set forth in claim 14, wherein the clamping law carrier has a portion widened in the peripheral direction.

18. A clamping chuck as set forth in claim 14, wherein the clamping chuck has a substantially hollow-cylindrical guide sleeve having a first and a second end and in which the object to be held with the clamping chuck can be received, wherein the guide sleeve has at least one opening for receiving a clamping jaw carrier.

19. A clamping chuck as set forth in claim 14, wherein the guide sleeve is rotatable about the cylinder axis, wherein the guide sleeve has a respective bearing at its first and its second end, wherein the clamping jaw carriers and the clamping sleeve are arranged between the bearings.

20. A cold pilger rolling mill comprising a clamping chuck as set forth in claim 14.

21. A cold pilger rolling mill as set forth in claim 20, wherein the clamping chuck is so adapted that it receives and holds the tube shell.

22. A cold pilger rolling mill as set forth in claim 20, wherein the clamping chuck is so adapted that it receives and holds a rolling mandrel or a tool holder connected thereto.

23. A cold pilger rolling mill as set forth in claim 20, comprising a mandrel support, a feed clamping device for the tube shell, an entry clamping device for the tube shell, an exit clamping device for the reduced tube and a clamping device for a rolling mandrel or a tool holder connected thereto,
   wherein the mandrel support, the feed clamping device for the tube shell, the entry clamping device for the tube shell, the exit clamping device for the reduced tube and the clamping device for the roiling mandrel or the tool holder connected thereto each have at least one clamping chuck.

24. A cold pliger rolling mill as set forth in claim 23, wherein the clamping chuck of the mandrel support, the feed clamping device for the tube shell, the entry clamping device for the tube shell, the exit clamping device for the reduced tube and the clamping device for the rolling mandrel or the tool holder connected thereto are identical except for the dimensioning of the clamping jaw carriers.

* * * * *